Aug. 29, 1944.  H. S. JONSSON  2,357,117
GRADUATING AND ENGRAVING MACHINE
Filed Oct. 8, 1941  6 Sheets-Sheet 1

Witness:
V. Siljander

Inventor
Helge S. Jonsson
By Stice & Stice Attys.

Aug. 29, 1944.   H. S. JONSSON   2,357,117
GRADUATING AND ENGRAVING MACHINE
Filed Oct. 8, 1941   6 Sheets-Sheet 2

Witness:
V. Siljander

Inventor
Helge S. Jonsson
By Lee & Lee Attys

Aug. 29, 1944. H. S. JONSSON 2,357,117
GRADUATING AND ENGRAVING MACHINE
Filed Oct. 8, 1941 6 Sheets-Sheet 3

Witness:
V. Siljander

Inventor
Helge S. Jonsson
By: Stice & Stice Attys.

Aug. 29, 1944. H. S. JONSSON 2,357,117
GRADUATING AND ENGRAVING MACHINE
Filed Oct. 8, 1941 6 Sheets-Sheet 6

Inventor
Helge S. Jonsson

Patented Aug. 29, 1944

2,357,117

UNITED STATES PATENT OFFICE

2,357,117

GRADUATING AND ENGRAVING MACHINE

Helge S. Jonsson, Villa Park, Ill., assignor to The C. H. Hanson Company, Chicago, Ill., a corporation of Illinois Application October 8, 1941, Serial No. 414,187

17 Claims. (Cl. 90—14)

The invention relates generally to engraving machines or the like and more particularly to machines for engraving or cutting graduations on metal objects such as gun sight drums, etc.

The invention has among its objects the production of a machine for cutting graduations which is fast in operation, requiring a minimum of manual labor, and which is very accurate and efficient.

Another object of the invention is the production of novel means for initially stenciling the drums prior to cutting and substantially checking the accuracy of the cut graduations thereon.

A further object of the invention is a novel mandrel construction whereby graduations may be cut in both the face and rim of the drum without removing the latter from the mandrel and with a minimum of time and labor.

A further object of the invention is the production of novel means for reciprocating and automatically feeding the cutter for each respective graduation.

A still further object of the invention is the production of novel means for readily and accurately positioning the mandrel and drum for cutting on the face or rim of the latter, as well as novel means for rotating the mandrel to accurately position the cutter in proper relation to the drum for cutting the various graduations.

A further object of the invention is the production of novel means for quickly and accurately varying the length of cutting stroke, as well as novel means for varying the depth of each cut taken.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

In the drawings, wherein like reference characters indicate like or corresponding parts.

In the past considerable difficulty has been experienced in cutting radial or parallel graduations on objects as such engraving or cutting required considerable manual labor which rendered the operation slow and tedious, particularly where high degrees of accuracy where required. One example of work of this type is that of yardage drums for gun sights and the like which employ graduations on both the face and the rim of the drum, and it is important that the graduations on the rim and face of the drum be in alignment.

Figs. 15 to 18 of the drawings illustrate such a type drum which may be readily and accurately cut on the present machine. The drum D illusrated comprises a circular face portion F bounded by a peripheral rim R, both the face portion and rim having a plurality of graduations G cut therein as well as corresponding numerals. The graduations G are cut entirely through the face and rim of the drum as clearly illustrated in Fig. 16, the graduations on the face extending radially, while the graduations on the rim extend vertically and are radially aligned with corresponding graduations on the face.

With the present invention such gun sight drums may be readily graduated in a minimum of time while providing a very high degree of accuracy and uniformity in the finished article. With the present invention the drum may be supported on the novel mandrel and secured thereto during the enttire cutting operations on both the face and rim of the drum thereby insuring proper alignment between the graduations on the face and those on the rim of the drum. The invention also contemplates novel means for accurately stencilling the location of the graduations on the drum prior to cutting the same, and subsequently checking the drums to determine any flaws or inaccuracies therein.

Referring to the drawings and more particularly to Figs. 1, 2, 4 and 8, the machine illustrated comprises a base or bed 1 having spaced standards 2 upon which is supported a block 3 in which is slidably carried a pair of parallel rods 4 and 5 respectively, rigidly connected at one of their corresponding ends to a cross-head 6. The cross-head 6 is provided with a vertically extending channel 7 forming ways for a split spindle head, designated generally by the numeral 8, which may be vertically moved relative the cross-head 6 and locked into position with respect thereto by set screws 9 or other suitable means. Clamped between the hinged halves 11 and 12 of the spindle head 8 is a sleeve 13 in which is slidably carried a cylindrical supporting member 14'. A spring 15 seated at one end upon the bottom of the sleeve 13 and bearing against a shoulder on the member 14' at the opposite end normally maintains the member 14' in raised position. The spindle proper 14 is rotatably carried by the member 14' on bearings 16, the nut 16' on the end of the spindle providing a means of adjustment. A cap member 17 threaded to the member 14' covers the end of the spindle. Carried on the spindle 14 is a drive pulley 18 and chuck 18' rigidly secured to the drive pulley 18. A suitable thumbscrew 19 locks the halves 11 and 12 of the spindle head to one another thereby firmly clamping the sleeve 13 therebetween, as shown in Fig. 5. A compression spring 21, encircying the rod 4 and interposed between the block 3 and a collar 22 secured to the free end of the rod 4, urges the cross-head 6 towards the block 3. Extending transversely to the axis of the rod 5 and positioned adjacent the free end thereof is a cam shaft 23 journaled in a U-shaped standard 24 secured to the block 3. Rigidly secured to the shaft 23 and engageable with the free end of the rod 5 is a disc-shaped cam 25, the latter preferably engaging a roller 5' to relieve friction between the cam and rod. In the construction illustrated the roller 5' is positioned in a slot in the end of the rod 5 and rotatably supported on a suitable pin.

Figure 1:
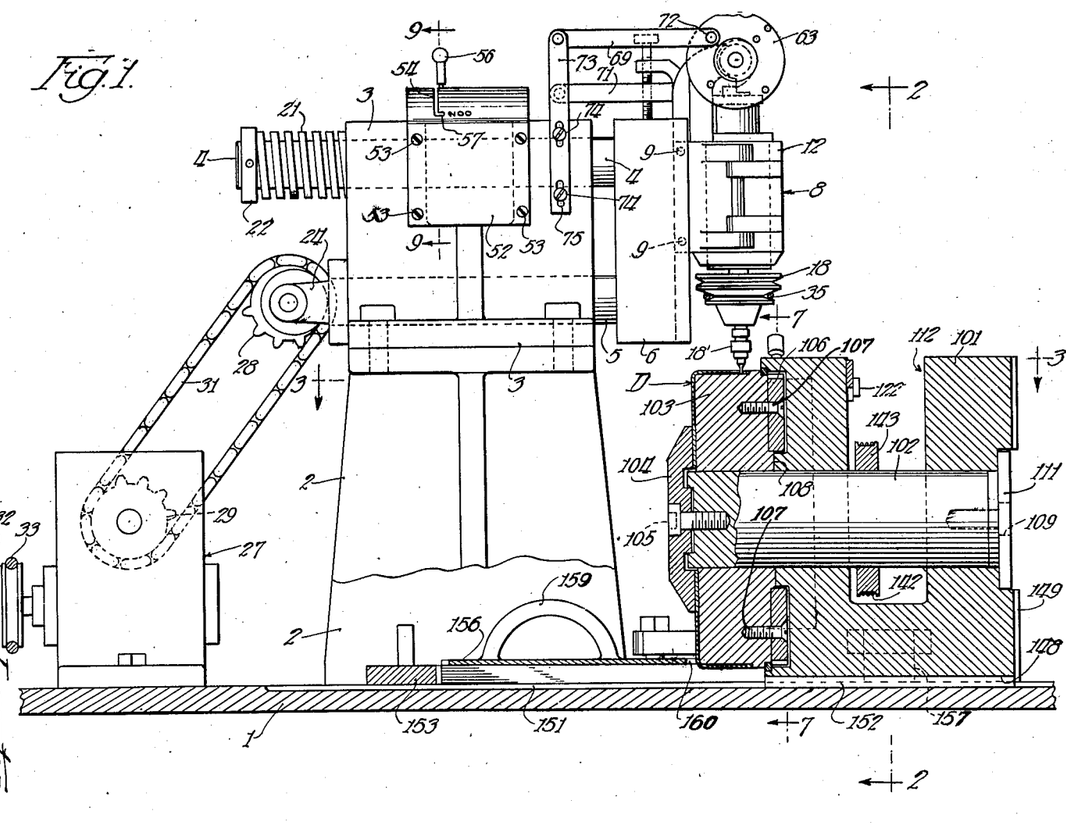
Fig. 1 is a sectional view taken approximately on the line 1—1 of Fig. 3 with the cutting mechanism shown in elevation.
Figures 7, 8, 9, 10, 11:
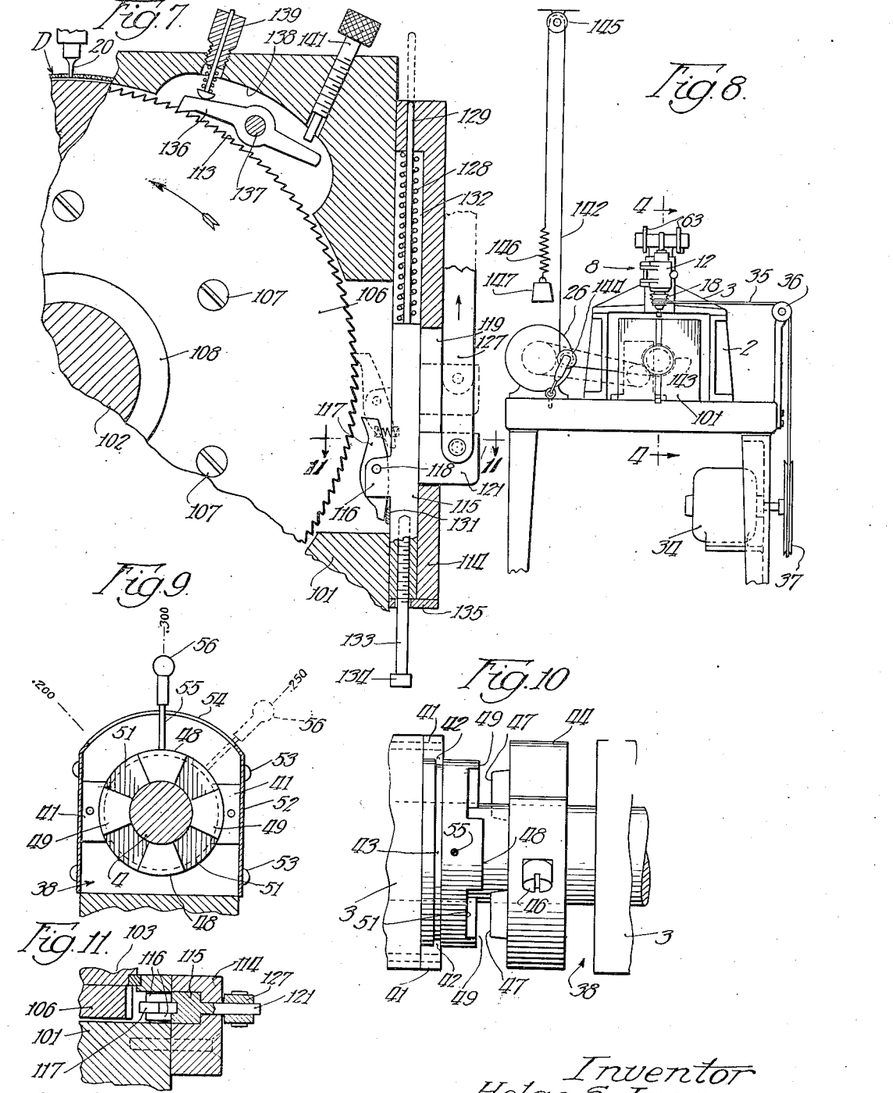
Fig. 7 is an enlarged partial section taken approximately on the line 7—7 of Fig. 1 illustrating the positioning pawl and feed mechanism for rotating the index plate and drum to its proper station for engraving.
Fig. 8 is a complete front elevation of the machine showing its various drives.
Fig. 9 is a sectional view taken approximately on the line 9—9 of Fig. 1.
Fig. 10 is a plan view of the adjusting means for varying the lengths of cuts in the graduations on the drum.
Fig. 11 is a sectional view through a portion of the mandrel rotating mechanism taken approximately on the line 11—11 of Fig. 7.

Referring to Figs. 1 and 8, the shaft 23 is operatively connected to a suitable source of power such as a motor 26 through a speed reducer indicated generally by the numeral 27 of any suitable character, the latter being connected to the shaft 23 by sprockets 28 and 29 and chain 31 while the motor 26 is operatively connected to the speed reducer by pulleys and a belt or other suitable means 32 indicating the pulley on the speed reducer 27 and 33 the connecting belt. In a like manner the pulley 18 is connected to a suitable source of power such as the motor 34 by means of a belt 35, pulleys 36 and the drive wheel 37 secured to the motor. Thus, the motor 26 will operatively rotate the cam shaft 23 so that the cam 25 bearing against the end of the rod 5 will move the cross-head 6 away from the block 3, this movement being resisted by the spring 21 whereby the latter will return the cross-head to its original position as a receding portion of the cam 25 engages the end of the rod 5. Thus, it will be apparent that as the motor 34 drives the chuck 18' and suitable cutting tool 20 carried thereby, the spindle and chuck will be laterally reciprocated.

*The cross-head stop construction*

Referring to Figs. 4, 5, 9 and 10, the block 3 is provided with a recess 38 exposing the rod 4. Rotatably carried by the rod 4 in the recess 38 is a stop ring 39, the latter being secured against longitudinal displacement relative the block 3 by blocks 41 secured to the block 3 by any suitable means and having flanges 42 positioned in the slot 43 of the ring. Secured to the rod 4 is a split stop collar 44, the latter being secured against rotation relative the rod by a key 45, and locked to the rod by a screw 46. Thus, the collar 44 may be longitudinally adjusted relative the rod and locked in any desired position. The collar 44 is provided with oppositely disposed projections or stops 47 engageable with like stops 48 and 49 carried by the ring 39. The stop or projections 48 and 49 are of different lengths and may be rotated into alignment with the stops 47 by rotating the ring 39. The portions 51 in the adjustment illustrated do not engage the stop 47 but merely permit full action of the cam 25, so that the travel of the cross-head will be equivalent to the differential between the high and low portions of the cam which in the construction illustrated is .300 inch. Thus, the length of stroke of the head 6 may be varied as desired, the ring 39 providing a plurality of different lengths of strokes, that illustrated being three. A further adjustment may be obtained by releasing the collar 44 and sliding the same longitudinally along the rod 4, the key 45 preventing rotation of the collar relative the rod.

The recess 38 is covered by a cap member 52 secured to the block 3 by screws 53 or the like, the member 52 having a slot 54 in the top thereof through which extends a small rod 55 secured to the ring 39 and terminating in a handle 56. Thus, by moving the handle 56 iu the slot 54 the ring 39 may be rotated to bring stops 48, 49 or 51 into alignment with the stops 47 on the collar 44, the member 52 being provided with notches 57 for receiving the rod 55 and maintain the ring 39 in any one of the plurality of positions, the rod 55 being sufficiently resilient to permit the same to be sprung into the slot 54 and moved to any one of the positions. It will be apparent that this construction permits the machine to be readily adjusted for a plurality of different length cuts. In the present instance, the ring 39 and collar 44 are designed and adjusted to permit the head 6 to be reciprocated .200 inch, .250 inch, or .300 inch depending upon the position of the handle 56. Obviously, by substituting another suitably designed ring for the ring 39 the number and relative lengths of the respective cuts may be varied.

The cutter feeding mechanism

Figures 2, 12, 13:
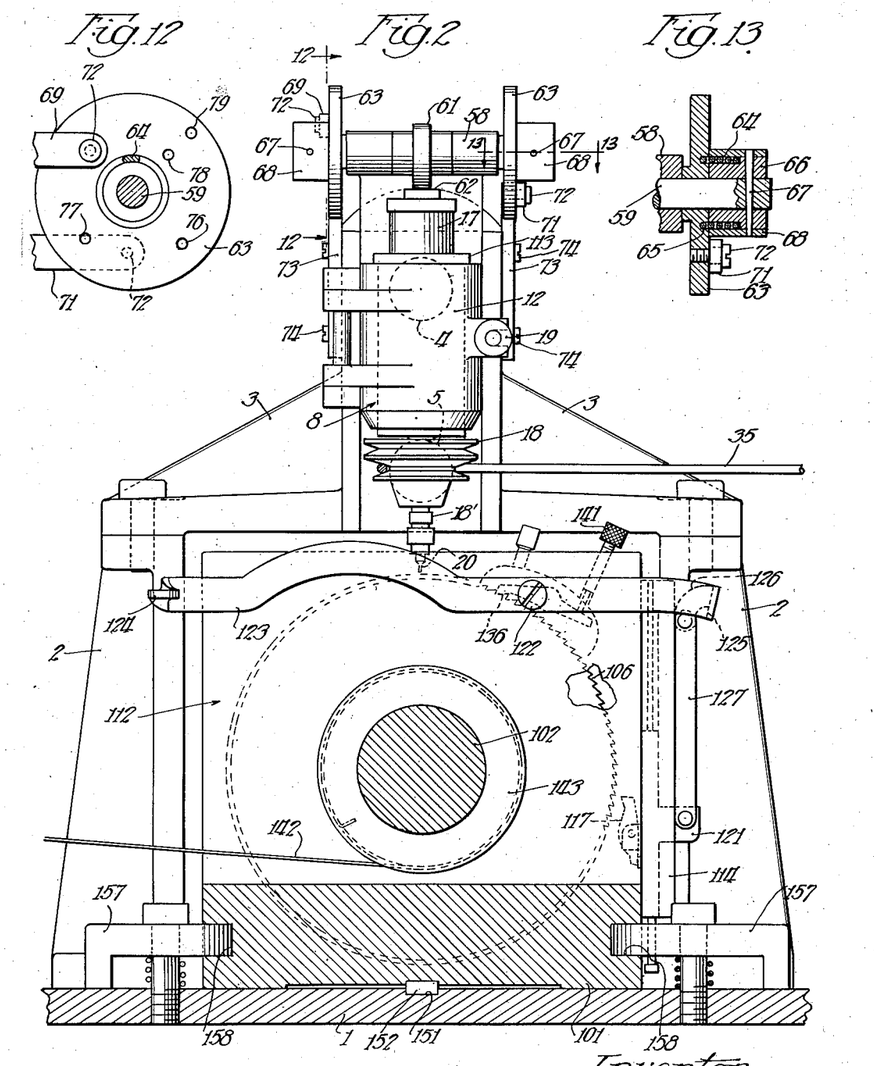
Fig. 2 is a sectional view taken approximately on the line 2—2 of Fig. 1.
Fig. 12 is a sectional view taken approximately on the line 12—12 of Fig. 2.
Fig. 13 is a sectional view taken approximately on the line 13—13 of Fig. 2.
Figure 3:
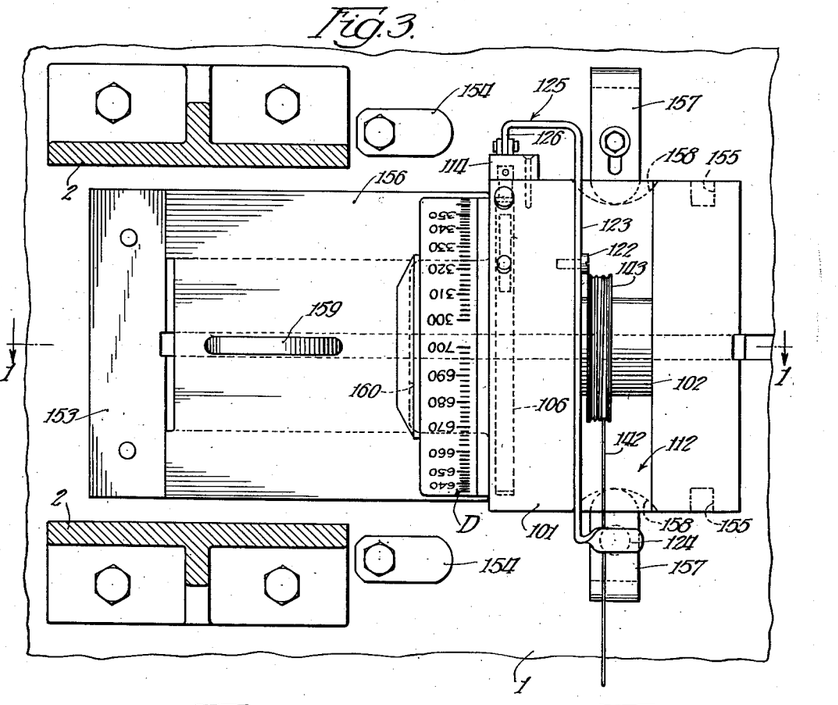
Fig. 3 is a sectional view taken approximately on the line 3—3 of Fig. 1.
Figure 4:
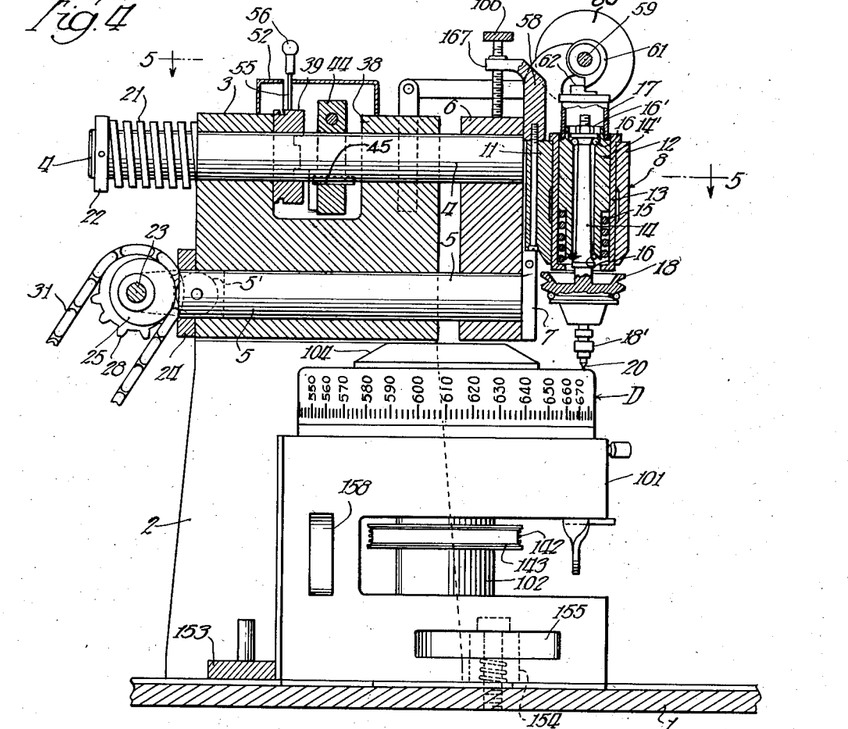
Fig. 4 is a sectional view taken approximately on the line 4—4 of Fig. 8 with the mandrel in a position to allow engraving of the graduations on the flat face of the drum, the mandrel being shown in elevation.
Figure 5:
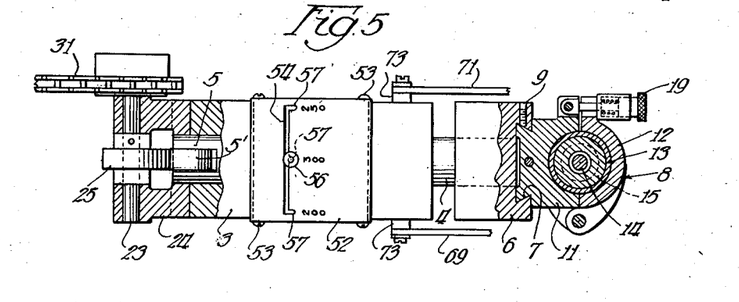
Fig. 5 is a sectional view taken approximately on the line 5—5 of Fig. 4 with the rear portion of the device broken away to disclose the reciprocating mechanism.
Figure 6:
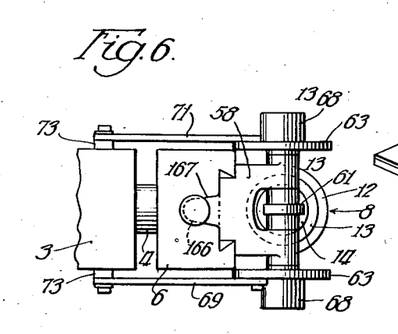
Fig. 6 is a plan view of the cutting head.

Secured to the spindle head 8 is a standard 58 having a cam shaft 59 journaled therein, the latter having a cam 61 rigidly secured thereto and engageable with the portion 62 of the cap member 17 as clearly shown in Figs. 2, 4 and 6. Thus, as the shaft 59 rotates, the cam 61 will urge the spindle downwardly against the action of the spring 15 until the hump or high point of the cam passes the projecting end 62 of the cap member 17 of the spindle head after which the spring 15 will move the spindle upwardly to its initial inoperative position which constitutes a trip action causing quick retraction of the cutter 20 from the surface of a piece of work. Carried by the shaft 59 at opposite sides of the standard 58 and freely rotatable relative the shaft 59 are a pair of discs 63, while rigidly secured at one end to their respective discs are coiled springs 64, the latter being secured to their respective discs by soldering or other suitable means with the adjacent ends positioned in slots 65 in the discs 63. As shown in Fig. 13, the springs 64 are each engageable with a collar 66 positioned adjacent the respective springs and secured to the shaft 59 by pins 67. A sleeve 68 encircles each collar 66 and spring 64 and is secured to the collar and the shaft by the pins 67. The two springs 64 are in this case adapted for moving shaft 59 and the associated collar mechanisms and act as clutch means for alternately and operatively connecting each of the separate discs 63 to impart unidirectional movement by increments to shaft 59 and to the cam 61 carried thereby. However, the discs 63 are simultaneously oscillated in opposite directions by appropriate links 69 and 71 in the manner hereinafter described, so that the respective springs 64 are wound in a direction wherein relative oscillatory movement of the discs in one direction causes one spring 64 to angularly advance the shaft 59 in a counterclockwise direction as viewed in Fig. 4, while the other spring slips or idles, and whereby relative oscillatory movement of said discs in the other direction causes the other spring 64 to further angularly advance the shaft 59 and its cam 61 in the same counterclockwise direction while the said first spring then slips or idles. Thus, the discs 63 are operatively connected to the shaft 59 by a pair of oppositely operable one way clutches formed by the springs 64 and their respective collars 66. Pivotally secured to the respective discs are links 69 and 71, the latter being secured to the discs by suitable screws 72, the link 69 being pivotally secured to its disc at a point above the axis of the shaft 59 and the link 71, at a point below the axis, these details being clearly illustrated in Figs. 1–6 and 12. The opposite ends of the respective links are pivotally secured to uprights 73 rigidly secured to the block 3 by screws 74, the latter passing through slots 75 in the respective uprights whereby the uprights may be vertically adjusted. It will be apparent that as the cross-head 6 together with spindle head 8 and standard 58 move away from the block 3 the link 69 will cause its disc 63 to be rotated in a counterclockwise direction as viewed in Fig. 12, thereby partially rotating the shaft 59 with it. At the same time the link 71 will rotate its disc 63 in a clockwise direction and as its spring 64 will tend to unwrap about its respective collar 66, the disc will slip relative the shaft 59. On the return movement of the head 6 and standard 58 towards the block 3 the operation is reversed, whereby the link 69 will rotate its disc 63 in a clockwise direction allowing the spring 64 connected with the associated disc 63 to slip relative to shaft 59 while the link 71 will rotate its disc in a counterclockwise direction and with it the shaft 59 through the clutching action of the spring 64 associated with the disc connected with link 71. Thus, each time the head 6 is reciprocated relative the block 3 the spindle 14 will be fed downwardly during each forward and return movement of the head by predetermined increments to produce a gradual and steady penetration of the piece of work by the cutter 20 as the latter is moved relative to the piece of work by means of the cam 25. The feed of cutter 20 for each horizontal movement of the cross-head 6 has been preferably arranged by means of the double disc and spring construction in order to obtain a faster axial feed of the cutter 20 inasmuch as the lateral movement of the cutter is fairly rapidly accomplished by means of the cam 25. In other words, the cutter 20 will be advanced during each horizontal movement of the head 6 to double the number of cutting strokes by utilizing each of the movements of the head 6 over the number of strokes through which the cutter 20 would be effective if the feed of the cam 61 were only to occur for either the forward or rearward strokes of the cross-head 6. To provide an adjustment for varying the feeding action of the spindle, the discs 63 are provided with additional holes 76, 77, 78 and 79 for receiving the screws 72, as shown in Fig. 12, the holes being positioned on various radii from the axis of the shaft 59. Thus, by securing the links 69 and 71, for example, to their respective discs 63 by positioning the screws 72 in the holes 78 which are positioned on the shortest radii from the axis of the shaft, the discs will be rotated a relatively large amount, while if the screws are positioned in the holes 79 located on a longer radii the discs will be rotated a relatively small amount. Thus, by merely making minor adjustments any one of a plurality of feeds may be utilized.

The drum supporting mandrel

As illustrated in Figs. 1, 2, 3 and 4 the drum supporting mandrel comprises a base block or member 101 in which is journaled a spindle 102 having a head 103 secured thereto adjacent one end of the spindle, the head 103 being of approximately the same size and shape as the internal dimensions of the drum D. The latter is secured to the head 103 by the cap plate 104 which securely clamps the face of the drum between it and the head 103, this being accomplished by the bolt 105 threaded into the spindle 102. Secured to the opposite face of the head 103 is an index plate 106, the latter being secured to the head by screws 107 or other suitable means. The head 103 is also provided with a shoulder 108, adjacent the spindle 102, which butts against a portion of the base block 101. Secured to the opposite end of the spindle 102 by means of a bolt 109 is a cap plate 111, the latter maintaining the head 103 in contact with the block 101 and preventing longitudinal movement of the spindle 102 and associated parts. The block 101 is cut away as shown at 112 to thereby expose the spindle 102. The index plate 106 is provided with very accurately formed teeth about its periphery, each tooth corresponding to a graduation on the dial and it will be apparent that the accuracy in spacing the graduations in a large measure will depend upon the accuracy with which the teeth 113 are formed in the index plate. Secured to the block 101 adjacent the periphery of the index plate 106 is a channeled block 14 in which is slidably carried a pawl supporting member 115, the latter having spaced inwardly extending ears 116 between which is positioned a spring biased pawl 117, the latter being pivotally connected to the ears by means of a pin 118. Also extending from the member 115 and passing through the slot 119 in the block 114 is a lug 121. Pivotally mounted on the block 101 by means of a screw 122 is an actuating lever 123, the latter terminating at one end in a handle 124 and at the other in a U-shaped portion indicated generally by the numeral 125, the extreme end portion 126 thereof being operatively connected to the lug 121 by a link member 127 pivotally connected at its ends to the portion 126 and the lug 121 respectively. A spring 128 encircling the guide rod 129 urges the member 115 downwardly to engage the pawl 117 with a plate 131 extending across the member 115 and secured to a stationary portion of the mandrel such as the base block 101 or the block 114 so that engagement of the pawl 117 therewith will rotate the pawl out of engagement with the index plate. As the actuating lever 123 is moved towards the spindle 102 by means of the handle 124 the member 115 will be moved upwardly in the channel 132 in the block 114, assuming the mandrel to be positioned as illustrated in Figs. 1, 3 and 7. As this movement takes place the pawl 117 will be disengaged from the plate 131 after which it will engage the index plate, continued movement of the member 115 thereby rotating the index plate. The amount of rotation of the latter may be readily varied by means of a suitable screw 133 which may be screwed in or out of the member 115, the head 134 of the screw being adapted to engage the plate 135 screwed to the bottom of the block 114 thereby limiting the upward movement of the member 115. The stationary pawl 136 is pivotally connected to the block 101 by a pin 137, the pawl being positioned in a recess 138 in the block 101. The pawl 136 is urged into engagement with the teeth 113 on the index plate by a spring actuated member 139 and may be released from the index plate by engaging the pawl with the screw 141 to rotate the pawl out of engagement with the plate whereby the latter may be reset etc. To insure proper positioning of the index plate 106 and maintain the respective teeth 113 in engagement with the pawl 136, a tensioning cable 142 is secured at one end to a drum 143 rigidly carried by the spindle 102, the cable passing around the drum several times, then through a sheave 144 as illustrated in Fig. 8, the sheave 144 being operatively fastened to the bed 1 of the machine. From the sheave 144 the cable 142 extends upwardly to a second sheave 145 mounted on some stationary object with respect to the bed and thence downwardly and connected to one end of a spring 146, the opposite end of the latter having a weight 147 secured thereto. The weight 147 acting through the spring 146 and cable 142 maintains the teeth 113 of the index plate firmly in engagement with the pawl 136 and insures the index plate being accurately positioned with respect to the pawl.

It will be noted that the pawl 117 is out of engagement with the index plate other than when the member 115 is moved upwardly to rotate the plate so that the pawl 117 offers no resistance to the accurate positioning of the index plate. The spring 146 takes up the shock on the teeth 113 as the latter engage the pawl 136 and prevents inaccuracies in the positioning of the drum due to distortion of the pawl or teeth on the index plate which might result from the direct application of the weight without the cushioning spring 146.

The block 101 is adapted to be positioned on the bed 1 with the spindle 102 in either a horizontal position as illustrated in Fig. 1 or a vertical position as illustrated in Fig. 4 for cutting graduations on the rim and face of the drum respectively. As illustrated in Fig. 1 the block 101 is provided with keyways 148 and 149 and the bed 1 provided with a corresponding keyway 151. A key 152 locks the block 101 with the axis of the spindle 102 lying in the plane of the axis of the spindle 14 regardless of whether the spindle 102 is in horizontal position as illustrated in Fig. 1 or in the vertical position as illustrated in Fig. 4, the key 152 being positioned in the keyways 148 and 149 respectively. The block 101 is aligned longitudinally with respect to the cutter when the spindle 102 is in a vertical position by butting the same up against a stationary stop 153 secured to the bed 1, the block 101 being secured to the bed 1 by clamps 154 positioned in slots 155 in the side walls of the block.

Figure 14:
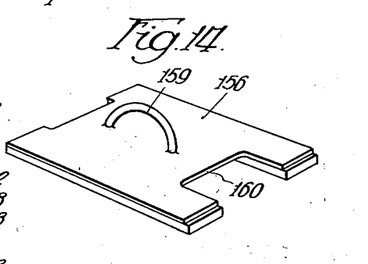
Fig. 14 is a persecttive view of the mandrel stop utilized when the mandrel is positioned for cutting graduations on the rim of the drum as illustrated in Fig. 3.

When it is desired to cut graduations on the rim of the drum the block is turned over and the key 152 engaged with the keyways 148 and 151 and in this relation of the block 101 a stop plate 156 as best illustrated in Figs. 1, 3 and 14 is positioned between the stop 153 and the block, whereby the block butts against the stop plate which in turn butts against the fixed stop 153, as shown in Figs. 1 and 3. In this position the block is secured to the bed by L-shaped clamps 157 engageable with the slots 158 in the side walls of the blocks 101. To facilitate the insertion or removal of the stop 156, the latter is provided with a handle 159 and is cut away as shown at 160 to receive the drum D.

The operation of the device

Figures 15, 16:
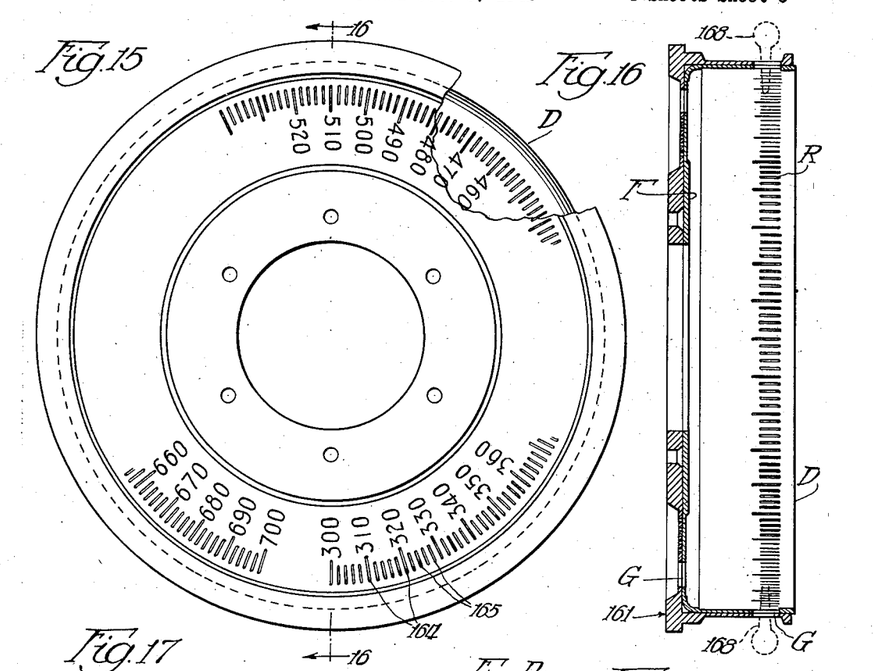
Fig. 15 is a face or plan view of the master checking drum with parts broken away to disclose the drum therein being checked.
Fig. 16 is a sectional view taken approximately on the line 16—16 of Fig. 15.
Figures 17, 18:
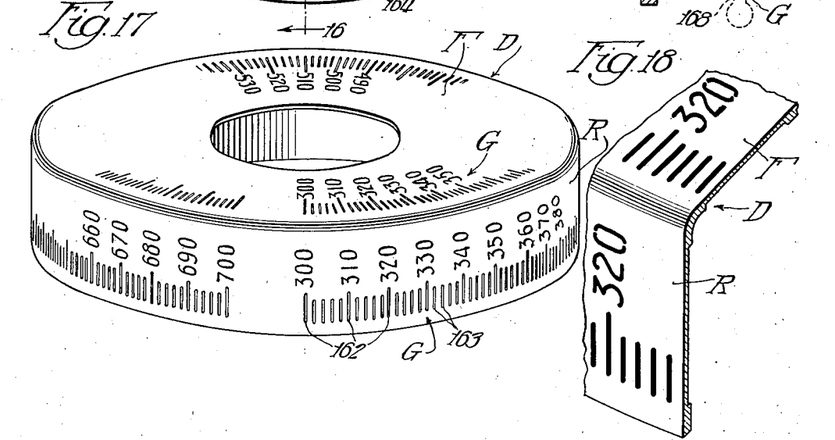
Fig. 17 is a perspective view of the drum after cutting.
Fig. 18 is a perspective view of a portion of the drum prior to cutting thereof illustrating the stencilling of the graduations.

Before the drum D is placed upon the mandrel for the cutting operation, the drum is positioned, as illustrated in Fig. 16, in a master drum 161 in which are cut all the graduations, the master drum 161 having been very closely checked as to the accuracy thereof. The drum D is then sprayed using the drum 161 as a stencil to thereby mark the locations of all graduations. The drum D is then secured to the mandrel by placing it upon the head 103 and clamping it thereto with the cap plate 104, the stenciled graduations on the drum being aligned with the index plate by a suitable index mark on the head 103. The mandrel is then locked to the bed 1 in the position illustrated in Fig. 1 although, if desired, the face may be cut first, in which case the mandrel would be positioned as illustrated in Fig. 4. Assuming, however, that the rim is to be cut first, the mandrel is locked into position as mentioned, the stop plate 156 being interposed between the block 101 and the stop 153. In the drum illustrated in Figs. 15 to 18, the graduations are of predetermined lengths, the ten yard graduations 162 being .250 inch in length, while the intermediate two yard graduations 163 are .200 inch in length. The face graduations are larger than the rim graduations, the ten yard graduations 164 being .300 inch in length, while the two yard intermediate graduations 165 are .250 inch in length. It has been found desirable as a means of saving time in adjusting the machine to cut all the graduations of the same length on the rim or on the face at one time in which case, assuming the machine is set up as illustrated in Fig. 1, the limiting screw 133 would be adjusted to permit a movement of the lever 123 a sufficient distance to rotate the index plate five notches, the handle 56 for controlling the length of the graduations being positioned as indicated in dotted lines in Fig. 9 to cut a slot of .250 inch in length.

The motors 34 and 26 are then started, the motor 34 driving the chuck 18' and cutting tool 20 at approximately sixteen to eighteen thousand revolutions per minute, while the motor 26 drives the cam shaft 23 at approximately one hundred to one hundred and fifty revolutions per minute although this speed may readily be varied to suit conditions. As the head 6, the spindle head 8 and with it the spindle and cutting tool reciprocate, the cam 61 will be rotated to feed the spindle 14 downwardly bringing the cutter 20 into contact with the drum and thereby cutting the graduation, this action continuing until the high portion of the cam 61 disengages the end 62 of the cap member 17 of the member 14' after which the spring 15 will return the spindle to its original position. The spindle head 8 may be raised or lowered with respect to the head 6 by loosening set screws 9 and moving the head until the cutter 20 will just pass through the drum when the highest portion of the cam 61 is engaged with the end 62 of the spindle. The spindle head 8 may be accurately adjusted with respect to the head 6 by means of an adjusting screw 166 carried by the standard 58, the latter having an extension 167 into which the screw 166 is threaded, as illustrated in Figs. 1, 4 and 6. When the spindle head 8 has been properly positioned with respect to the head 6 the set screws 9 may be again tightened to firmly lock the two in the adjusted position. As soon as the spindle 14 is returned to its original raised position the lever 123 may be manually actuated by the operator of the machine to rotate the drum through five notches after which the cycle is again repeated. Thus, all the ten yard graduations may be cut in the drum after which the drum is moved one notch and the handle 56 moved to the left hand side, as viewed in Fig. 9, for cutting slots of .200 of an inch in length. The adjustment of the lever 123 may remain the same so that every fifth graduation is cut as the drum is rotated etc., until all the graduations on the rim of the drum have been cut.

The clamps 157 are then released, the stop plate 156 removed and the mandrel rotated to vertically position the spindle 102. The block 101 is then moved into engagement with the stop 153, as illustrated in Fig. 4, and the block 101 clamped to the bed by means of the clamps 154. The handle 56 is then positioned in the center of the slot 54, as illustrated in Fig. 5, and the ten yard graduations on the face cut therein. Obviously, as the relation of the drum to the head 103 has not been altered the corresponding slots on the face of the drum must be radially aligned with the slots on the rim.

Likewise, the intermediate graduations 165 are cut in the face of the drum in a manner similar to that described for the graduations 163. As previously mentioned, the ten yard graduations on the face of the drum are .300 inch in length, while the intermediate graduations are .250 inch in length. After the drum has been completely cut the mandrel is disengaged from the bed and the cap plate 104 removed to release the drum.

The latter may then be readily checked as to the accuracy of the graduations by inserting the drum in the master drum 161, as illustrated in Figs. 15 and 16, and locked therein by suitable keys 168 indicated in dotted lines in Fig. 16, the keys passing through corresponding slots in the two drums. If the drum D has been correctly cut all of the graduations will be properly aligned with the graduations cut in the master drum 161, any any inaccuracies may be readily determined.

It will be apparent that while I have set forth various dimensions with regard to the length of cuts, etc., any desired length of cut may be taken, the dimensions set forth merely being illustrative of one particular size drum and as previously mentioned the device is particularly efficient in cutting drums such as that illustrated for gun sight mechanisms and the like, resulting in a gun sight that is equal to, if not, greater in accuracy to sights made by prior methods and results in a considerable reduction in the cost of such sights due to the great saving in time involved.

It will be noted from the above description that I have produced a machine whereby graduations may be readily and accurately formed therein on both the rim and face of the drum or other object and in which the machine may be readily and accurately set up for cutting on either the face or rim. It will also be noted that I have provided novel means for reciprocating the cutting mechanism and adjusting the same for graduations of various lengths as well as novel means for automatically feeding the cutter into the material being cut. Likewise, I have provided novel means for accurately rotating the drum including means for maintaining the drum in proper position which will not result in distortion of various parts of the device and which otherwise might reduce its accuracy.

Having thus described my invention, it is obvious that various immaterial modifications may be made in the same without departing from the spirit of my invention; hence, I do not wish to be understood as limiting myself to the exact form, construction, arrangement, and combination of parts herein shown and described or uses mentioned.

What I claim as new and desire to secure by Letters Patent is:

1. In a machine of the kind described, the combination of a supporting member, a cross-head carried by and movable relative to said member, a cam engageable with a portion of said cross-head for reciprocating the same in one direction, and spring means for moving said head in the opposite direction, stop means for adjustably limiting the movement of said head in said opposite direction, a rotary cutting spindle operatively carried by said head, drive means for rotating said spindle, means for axially feeding said spindle during reciprocation of said head, and work supporting means operatively related to said cutting spindle.

2. In a machine of the kind described the combination of a supporting member, a pair of parallel rods slidably carried by said member, a cross-head rigidly secured to said rods adjacent corresponding ends of the latter, means for positively moving said rods and head in one direction, and spring means for moving said head in the opposite direction, abutment means carried by one of said rods and an adjustable stop element therefor connected with said supporting member for limiting the return movement of said cross-head, and a cutter operatively carried by said head.

3. In a machine of the kind described, the combination of a supporting member, a pair of parallel rods slidably carried by said member, a cross-head rigidly secured to said rods adjacent corresponding ends of the latter, a cam positioned adjacent the opposite end of one of said rods and engageable therewith to longitudinally move said cross-head, a compression spring engageable with means on the other rod for returning said cross-head towards said cam, means for limiting the travel of said cross-head, a cutter spindle carried by said head and axially movable relative thereto, a cam shaft journaled on said head extending transversely to said spindle, a cam rigidly carried by said shaft and engageable with the end of said spindle, a pair of feeding members rotatably carried by said shaft, a spring operatively connected to each of said members and frictionally engageable with said shaft for rotating the latter in one direction, and a pair of link members operatively connected to respective feed members adjacent one of their respective ends and to said supporting member adjacent their other ends, one of said members being connected to its feed member at a point below the axis of said cam shaft, and the other to its feed member at a point above said axis whereby reciprocation of said head will move said feed members in opposite directions to feed said cutter spindle during each forward and return stroke of said head.

4. In a machine of the kind described, the combination of a supporting member, a pair of parallel rods slidably carried by said member, a cross-head rigidly secured to said rods adjacent corresponding ends of the latter, a cam positioned adjacent the opposite end of one of said rods and engageable therewith to longitudinally move said cross-head, means for rotating said cam, a compression spring engageable with means on the other rod for moving said cross-head in the opposite direction, a stop member rigidly carried by one of said rods, a second stop member positioned in the path of said first stop member and engageable therewith to limit the return movement of said cross-head, said second stop member having a plurality of faces adapted to be positioned in the path of said first stop member for varying the movement of said cross-head, a cutter spindle carried by said cross-head and axially movable relative said head, a rotary cutter carried by said spindle, means for actuating said cutter, a rotary cam engageable with said spindle for moving the same, a pair of feeding members, means operatively connecting said members to said cam for actuating the latter when said members are rotated in one direction, and a pair of link members operatively connected to respective feed members adjacent one of their respective ends and to said supporting member adjacent their other ends, one of said members being connected to its feed member at a point below the axis of said cam, and the other member to its feed member at a point above said axis, whereby reciprocation of said head will move said feed members in opposite directions to feed said cutter spindle during each forward and return stroke of said head.

5. In a device of the kind described, the combination of a supporting member, a cross-head carried thereby and movable relative thereto, means for advancing said cross-head to a fixed position and spring means for returning the same, a stop member carried by said cross-head and a second stop member carried by said supporting member and rotatable thereon, said second stop member positioned in the path of said first stop member and engageable therewith to limit the return movement of said cross-head by said spring means, said second stop member having a plurality of faces adapted to be positioned in the path of said first stop member whereby said return movement of the cross-head may be varied, and manually operated means to adjust said second stop member to bring selected faces thereof into operative relation with respect to the first stop member.

6. In a machine of the kind described, the combination of a supporting member, a pair of parallel rods slidably carried by said member, a cross-head rigidly secured to said rods adjacent corresponding ends of the latter, a cam positioned adjacent the opposite end of one of said rods and engageable therewith to longitudinally move said cross-head, a compression spring engageable with means on the other rod for returning said cross-head towards said cam, a stop member rigidly carried by one of said rods, a stop ring encircling the latter rod and rotatable relative said said stop member, said stop ring having a plurality of faces adapted to be positioned in the path of said stop member for varying the movement of said cross-head, and cutting means operatively carried by said head.

7. In a machine of the kind described, the combination of a supporting member, a cross-head carried by said member and movable relative thereto, means for reciprocating said head, a cutter carried by said head and axially movable relative thereto, a cam engageable with said cutter for axially moving the same, a pair of oppositely operable clutch feed members, means successively connecting said clutch feed members to said cam for actuating the latter when said members are rotated in either direction, and means for moving said feed members in opposite directions during reciprocation of said head.

8. In a machine of the kind described, the combination of a cutting head, a rotary cutting spindle carried thereby, said spindle being axially movable relative said head, cam means operatively related to said spindle for moving the same in one direction and spring means for moving said spindle in the opposite direction, a pair of feed discs, oppositely operable clutch means for independently connecting said discs to said cam for rotating the latter in one direction, and means for oscillating said discs whereby each reversal of motion imparts unidirectional motion to said cam through the agency of said oppositely operable clutch means.

9. In a machine of the kind described, the combination of a supporting member, a pair of parallel rods slidably carried by said member, a cross-head rigidly secured to said rods adjacent corresponding ends of the latter, a cam positioned adjacent the opposite end of one of said rods and engageable therewith to longitudinally move said cross-head, a compression spring engageable with means on the other rod for returning said cross-head towards said cam, means for limiting the travel of said cross-head, a cutter spindle carried by said head and axially movable relative thereto, a cam shaft journaled on said head extending transversely to said spindle, a cam rigidly carried by said shaft and engageable with the end of said spindle, a pair of feeding members rotatably carried by said shaft, a spring operatively connected to each of said members and frictionally engageable with said shaft for rotating the latter in one direction, and means for rotating said members in opposite directions as said cross-head is reciprocated.

10. In an engraving machine, the combination of an engraving tool, reciprocating tool supporting means for supporting said tool in operative position and means to guide said tool in a predetermined path, operative means cooperating with said tool supporting means for reciprocating the same, means for continuously feeding said engraving tool downwardly into cutting engagement with a rotatably mounted piece of work during the reciprocating movements of the tool supporting means, and indexing means for said piece of work.

11. In an engraving machine, the combination of an engraving tool, a fixed support, reciprocating tool holding means carried by said support and adapted for holding said engraving tool, said support and tool holding means coacting to guide said tool in a predetermined path with respect to a rotatably mounted piece of work, cooperative means for actuating said tool holding means, feed mechanism for continuously urging said engraving tool into said piece of work during the actuation of said tool holding means, and indexing means for said piece of work.

12. In an engraving machine, the combination of an engraving tool, means for reciprocably moving said tool along a definite path in relation to the surface of a piece of work, and means for continuously feeding said engraving tool by gradual increments into the surface of said piece of work during the entire reciprocal movement of said engraving tool for both directions of movement thereof and indexing means for said piece of work.

13. In an engraving machine, the combination of a rotary engraving tool, drive means for rotating said tool, a fixed support, movable means carried by said support and adapted for holding said engraving tool, said support and movable means coacting to guide said tool in a predetermined path in relation to the surface of a piece of work, and cooperative means on said movable means and coacting with said engraving tool to feed the latter by gradual increments into the surface of said piece of work, said cooperative means including trip means for quickly retracting said engraving tool from cutting contact with said piece of work, and link mechanism connected between said cooperable means and a point on said fixed support to operate the cooperable means and said trip means.

14. In an engraving machine, the combination of a rotary engraving tool, drive means for rotating said tool, a fixed support, reciprocating tool holding means carried by said support and adapted for holding said engraving tool, said support and tool holding means coacting to guide said tool in a predetermined path in relation to the surface of a piece of work, a feed mechanism carried by said tool holding means and coacting with said engraving tool to continuously advance said tool into the surface of said piece of work during the reciprocating movements of the tool holding means, and actuating mechanism operatively connected between said feed mechanism and said fixed support to operate said feed mechanism.

15. In an engraving machine, the combination of a rotary engraving tool, a fixed support, reciprocable means carried by said support and adapted for holding and reciprocating said engraving tool, said fixed support and reciprocable means coacting to guide said tool in a predetermined path in relation to the surface of a piece of work, a feed member carried by said reciprocable means and coacting with said engraving tool to continuously advance said tool into the surface of said piece of work during the reciprocating movements of the tool, and actuating mechanism operatively connected between said feed member and a fixed point on said support to operate said feed member, said actuating mechanism including means operable to advance said tool during either directional movement of said reciprocable means.

16. In an engraving machine, the combination of an engraving tool, a fixed support, reciprocable means carried by said support and adapted for holding and reciprocating said engraving tool, said fixed support and reciprocable means coacting to guide said tool in a predetermined path in relation to the surface of a piece of work, a feed member carried by said reciprocable means and coacting with said engraving tool to progressively advance said tool into the surface of said piece of work, and mechanism for actuating said feed member comprising a cam carried by said reciprocable means and engageable with said feed member, cam driving means including links connected between said cam and said fixed support and adapted for progressively advancing said cam to progressively advance said tool upon either directional movement of said reciprocable means, and trip means carried by said feed member coacting with said cam to instantly retract said engraving tool from cutting contact with said piece of work at predetermined intervals.

17. In an engraving machine, the combination of an engraving member, a stationary support and reciprocating means guided thereby for supporting and guiding said engraving member in a fixed path in a plane parallel to the surface of a piece of work, and tool advancing means including links to a fixed point on said support and coacting with said engraving member to progressively advance the same into the surface of said piece of work during the relative movement of said movable means, said operable means including means for withdrawing said engraving member from said piece of work.

HELGE S. JONSSON.